2,911,617

SILICA GEL AS UNDERWATER NOISE SOURCE

Alfred F. Mundy, Kittery, Maine, assignor to the United States of America as represented by the Secretary of the Navy No Drawing. Application November 7, 1952
Serial No. 319,442

1 Claim. (Cl. 340—5)

(Granted under Title 35, U.S. Code (1952), sec. 266)

The invention described herein may be manufactured and used by or for the Government of the United States of America for governmental purposes without the payment of any royalties thereon or therefor.

This invention relates to a method for generating underwater sound and in particular the invention relates to a method for testing underwater sonar transducers.

Heretofore electronic sound generators have been employed to furnish sound by which to test sonar transducers and associated receiving apparatus. Obviously such electronic sound generators may suffer minor breakdowns, thereby preventing or delaying tests of the sonar equipment.

An object of this invention is to provide a method for generating underwater sound.

Another object is to provide a method of generating sound by which to test underwater sonar transducers, which method is simple and inexpensive to execute.

Another object is to provide a source of sound that is simple and easy to use, inexpensive, and is of a nonmechanical and nonelectronic nature.

Another object is to provide a source of sound by which to test sonar equipment, the sound being generated by a reaction of a simple inorganic substance with water.

Another object is to provide a secondary means of generating sound whereby a double check of the transducer in conjunction with an electronic sound generator is facilitated.

Other objects and many of the attendant advantages of this invention will be readily appreciated as the same becomes better understood by reference to the following description.

Applicant's invention makes use of silica gel, a form of silicon dioxide. A common method of obtaining silica gel is to treat sodium silicate with sulfuric acid. The resulting reaction produces sodium sulphate and hydrated silicon dioxide. By dehydrating the latter, a silica gel is obtained. This substance has a porous or cellular structure, the cells within a given mass being extremely small and extremely numerous. The method of producing silica gel forms no part of this invention. The method of producing it is described merely to further point out the nature of the material employed by applicant. Any commercially produced silica gel may be employed in connection with this invention.

Applicant has discovered that if silica gel is immersed in water, a crackling sound is given off by reaction of the silica gel in the water. This sound is transmitted through the water, and if a sonar hydrophone is immersed in the water, the sound wave hitting the instrument will develop a fluctuating electrical potential in the transducer. This potential may be amplified by a receiving instrument and ultimately indicated in one form or other. The electrical energy applied to the receiving instrument is usually reconverted into acoustical energy as by headphones or a loudspeaker. If sound is emitted by the receiver output, it is an indication that the transducer and associated receiving apparatus are in working order and in operation.

Some of the principal advantages of using silica gel as an underwater sound source are that it is easily transported in small amounts, is inexpensive, and yields a continuous crackling sound of sufficient duration to be detected. It will be apparent to one skilled in the art that thereafter other tests, e.g., as to correct direction indication, may be conducted utilizing silica gel as a source of acoustical energy for the sonar transducers.

Obviously other materials, organic and inorganic, that exhibit similar acoustical characteristics when dropped in water may be employed.

Obviously many modifications and variations of the present invention are possible in the light of the above teachings. It is therefore to be understood that within the scope of the appended claim the invention may be practiced otherwise than as specifically described.

I claim:

A method of ascertaining the operativeness of a sonar transducer comprising the steps of immersing the sonar transducer in water whereby it is adapted to detect mechanical disturbance in the water if it is in operating condition, and dropping silica gel into the water to hydrate and generate mechanical disturbance below the surface of the water.

References Cited in the file of this patent

UNITED STATES PATENTS 2,398,432    Livermore _____ Apr. 16, 1942